US008760460B1

(12) United States Patent
Kilgariff et al.

(10) Patent No.: US 8,760,460 B1
(45) Date of Patent: Jun. 24, 2014

(54) HARDWARE-MANAGED VIRTUAL BUFFERS USING A SHARED MEMORY FOR LOAD DISTRIBUTION

(75) Inventors: Emmett M. Kilgariff, San Jose, CA (US); Steven E. Molnar, Chapel Hill, NC (US); Sean J. Treichler, Sunnyvale, CA (US); Johnny S. Rhoades, Durham, NC (US); Gernot Schaufler, Mountain View, CA (US); Dale L. Kirkland, Madison, AL (US); Cynthia Ann Edgeworth Allison, Madison, AL (US); Karl M. Wurstner, Madison, AL (US); Timothy John Purcell, Provo, UT (US)

(73) Assignee: NVIDIA Corporation, Santa Clara, CA (US)

(*) Notice: Subject to any disclaimer, the term of this patent is extended or adjusted under 35 U.S.C. 154(b) by 277 days.

(21) Appl. No.: 12/773,712

(22) Filed: May 4, 2010

Related U.S. Application Data

(60) Provisional application No. 61/252,111, filed on Oct. 15, 2009.

(51) Int. Cl.
  *G06T 1/60* (2006.01)
(52) U.S. Cl.
  USPC .............................. 345/557; 345/543; 345/545
(58) Field of Classification Search
  None
  See application file for complete search history.

(56) References Cited

U.S. PATENT DOCUMENTS

| 5,537,635 | A * | 7/1996 | Douglas ........................ 711/129 |
| 6,950,108 | B2 * | 9/2005 | Doyle et al. .................. 345/565 |
| 7,080,170 | B1 * | 7/2006 | Zuraski et al. ................ 710/52 |
| 7,355,601 | B2 * | 4/2008 | Andrews et al. .............. 345/505 |
| 7,468,985 | B2 * | 12/2008 | Karim et al. .................. 370/412 |
| 7,539,821 | B2 * | 5/2009 | Petev et al. .................... 711/134 |
| 8,095,727 | B2 * | 1/2012 | Rushworth et al. ........... 711/110 |
| 2003/0040896 | A1 * | 2/2003 | McWilliams et al. .......... 703/13 |
| 2006/0031839 | A1 * | 2/2006 | Kang ............................ 718/102 |
| 2008/0094412 | A1 * | 4/2008 | Jiao et al. ...................... 345/621 |
| 2009/0303245 | A1 * | 12/2009 | Soupikov et al. ............. 345/582 |
| 2010/0020090 | A1 * | 1/2010 | Langtind et al. ............. 345/581 |

OTHER PUBLICATIONS

"Nvidia GeForce 8800 GPU Architecture Overview", Tech. Brief TB-02787-001_v01, Nov. 2006.*
"Nvidia GeForce 8800 GPU Architecture Overview", TB-02787-001_v01, Nov. 2006.*
Dwarakinath, A. "A Fair-Share Scheduler for the Graphics Processing Unit", MS Thesis, Stony Brook University, Aug. 2008.*

* cited by examiner

*Primary Examiner* — Ulka Chauhan
*Assistant Examiner* — Patrick F Valdez
(74) *Attorney, Agent, or Firm* — Patterson & Sheridan, LLP

(57) ABSTRACT

One embodiment of the present invention sets forth a technique for using a shared memory to store hardware-managed virtual buffers. A circular buffer is allocated within a general-purpose multi-use cache for storage of primitive attribute data rather than having a dedicated buffer for the storage of the primitive attribute data. The general-purpose multi-use cache is also configured to store other graphics data sinces the space requirement for primitive attribute data storage is highly variable, depending on the number of attributes and the size of primitives. Entries in the circular buffer are allocated as needed and released and invalidated after the primitive attribute data has been consumed. An address to the circular buffer entry is transmitted along with primitive descriptors from object-space processing to the distributed processing in screen-space.

23 Claims, 11 Drawing Sheets

HARDWARE-MANAGED VIRTUAL BUFFERS USING A SHARED MEMORY FOR LOAD DISTRIBUTION

CROSS-REFERENCE TO RELATED APPLICATIONS

This application claims priority benefit to United States provisional patent application titled, "Hardware-Managed Virtual Buffers Using a Shared Memory For Load Distribution," filed on Oct. 15, 2009 and having Ser. No. 61/252,111.

BACKGROUND OF THE INVENTION

1. Field of the Invention

The present invention generally relates to graphics processing and more specifically to using a shared memory to store hardware-managed virtual buffers.

2. Description of the Related Art

Conventional graphics processors have processed primitives at a rate of up to one triangle per clock while maintaining the applications programming interface (API) specified primitive order. Graphics primitives, such as triangles are received in an ordered stream for processing. The DirectX and OpenGL APIs require that the primitive order be maintained, that is to say, the primitives must be rendered in the order presented by the application program. This requirement ensures that intersecting primitives will be rendered deterministically to avoid the introduction of visual artifacts. Additionally, the primitive order must be maintained since the results of rendering a later primitive may be dependent on the state of the frame buffer resulting from rendering an earlier primitive, particularly when blending is used.

While many graphics processors have used parallelism to increase processing throughput, systems capable of rendering more than one triangle per clock while processing from a single API input stream typically do not maintain primitive ordering at full speed. Processing of the primitives necessitates the transfer of primitive attributes between processing units and storage of processed primitive attributes for access by different processing units. The amount of data that must be stored is dependent on primitive sizes and rates and is highly variable. In large triangle cases it is small, but in small-primitive cases when the primitive rate is high it can be extremely large. It is wasteful to provide a large fixed buffer that is seldom needed, yet the buffering requirements must be met to sustain high primitive rates.

Accordingly, what is needed in the art is a system and method for storing processed attributes in a general-purpose cache, which can be advantageously used for other purposes when not storing attributes.

SUMMARY OF THE INVENTION

A system and method for using a shared memory to store primitive attributes in hardware-managed virtual buffers. A circular buffer is allocated within a general-purpose multi-use cache for storage of primitive attribute data rather than having a dedicated buffer for the storage of the primitive attribute data. The general-purpose multi-use cache is also configured to store other graphics data since the space requirement for primitive attribute data storage is highly variable, depending on the number of attributes and the size of primitives. Entries in the circular buffer are allocated as needed and released and invalidated after the primitive attribute data has been consumed. An address to the circular buffer entry is transmitted along with primitive descriptors from object-space processing to the distributed processing in screen-space.

Various embodiments of a method of the invention for sharing a general-purpose multi-use cache for storage of graphics data include allocating a circular buffer entry of a circular buffer within a portion of the general-purpose multi-use cache to store primitive attribute data, wherein another portion of the general-purpose multi-use cache is configured to store other graphics data. The primitive attribute data is written to the circular buffer entry and a circular buffer entry address corresponding to the circular buffer entry is transmitted from a first processing unit configured to perform object-space operations to selected second processing units configured to perform screen-space operations. A circular buffer "done" message corresponding to the circular buffer entry is transmitted from each one of the selected second processing units configured to perform screen-space operations to the first processing unit configured to perform object-space operations. A circular buffer invalidate message is generated when the circular buffer done message is received from all of the selected second processing units and the circular buffer entry in the general-purpose multi-use cache is invalidated by the circular buffer invalidate message.

Various embodiments of the invention include a system for sharing a general-purpose multi-use cache for storage of graphics data. The system includes the general-purpose multi-use cache, where a first portion of the general-purpose multi-use cache is configured to store primitive attribute data in entries of a circular buffer, a second portion of the general-purpose multi-use cache is configured to store other graphics data, and the general-purpose multi-use cache is configured to invalidate a circular buffer entry when a circular buffer invalidate message is received. The system also includes a first processing unit configured to perform object-space operations and second processing units configured to perform screen-space operations. The second processing units are also each configured to transmit a circular buffer done message corresponding to a circular buffer entry to the first processing unit. The first processing unit is also configured to allocate the circular buffer entry in the circular buffer to store primitive attribute data, write the primitive attribute data to the circular buffer entry, transmit a circular buffer entry address corresponding to the circular buffer entry to selected second processing units, generate the circular buffer invalidate message when the circular buffer done message is received from all of the selected second processing units, and transmit the circular buffer invalidate message to the general-purpose multi-use cache.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
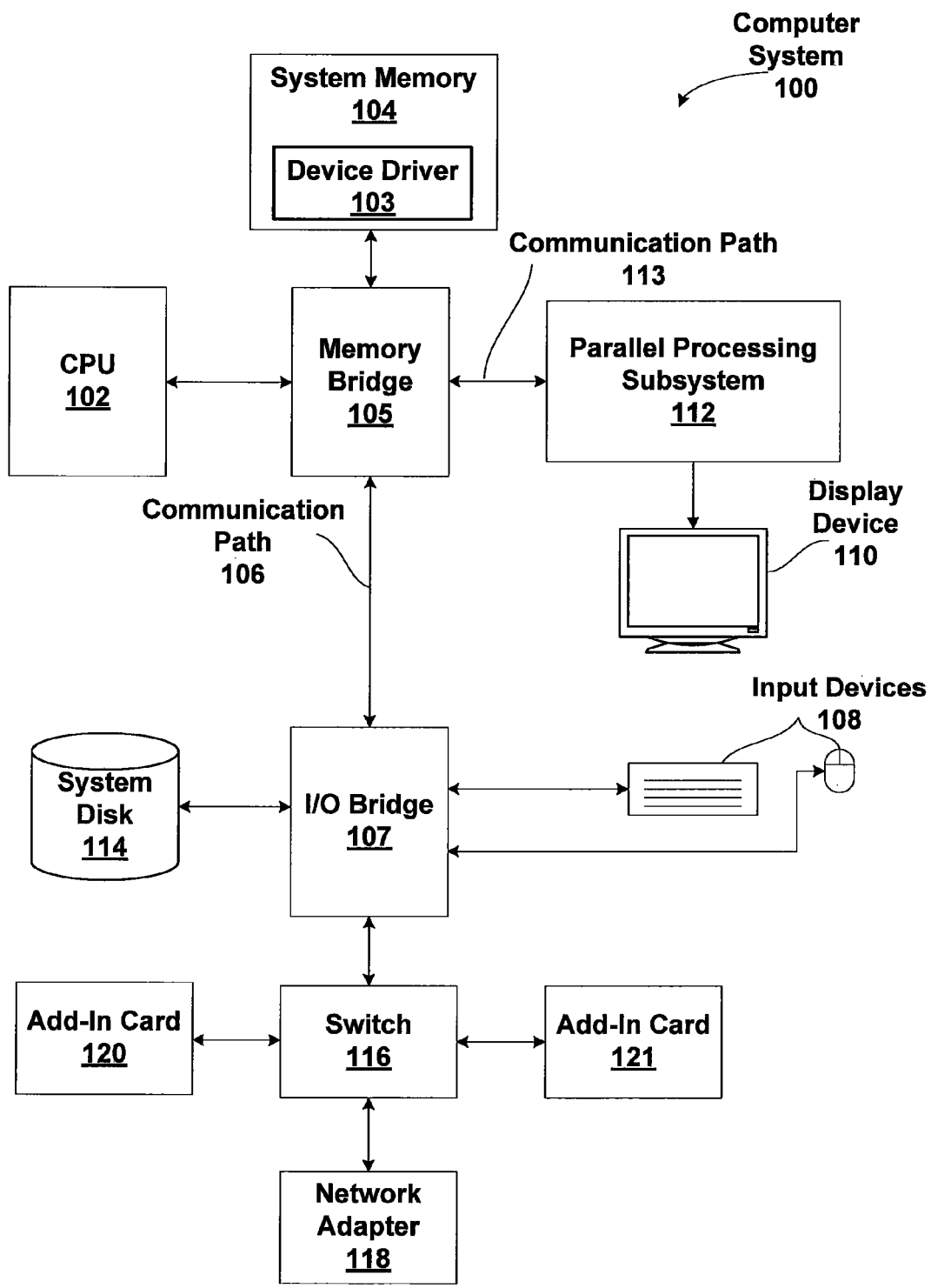
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
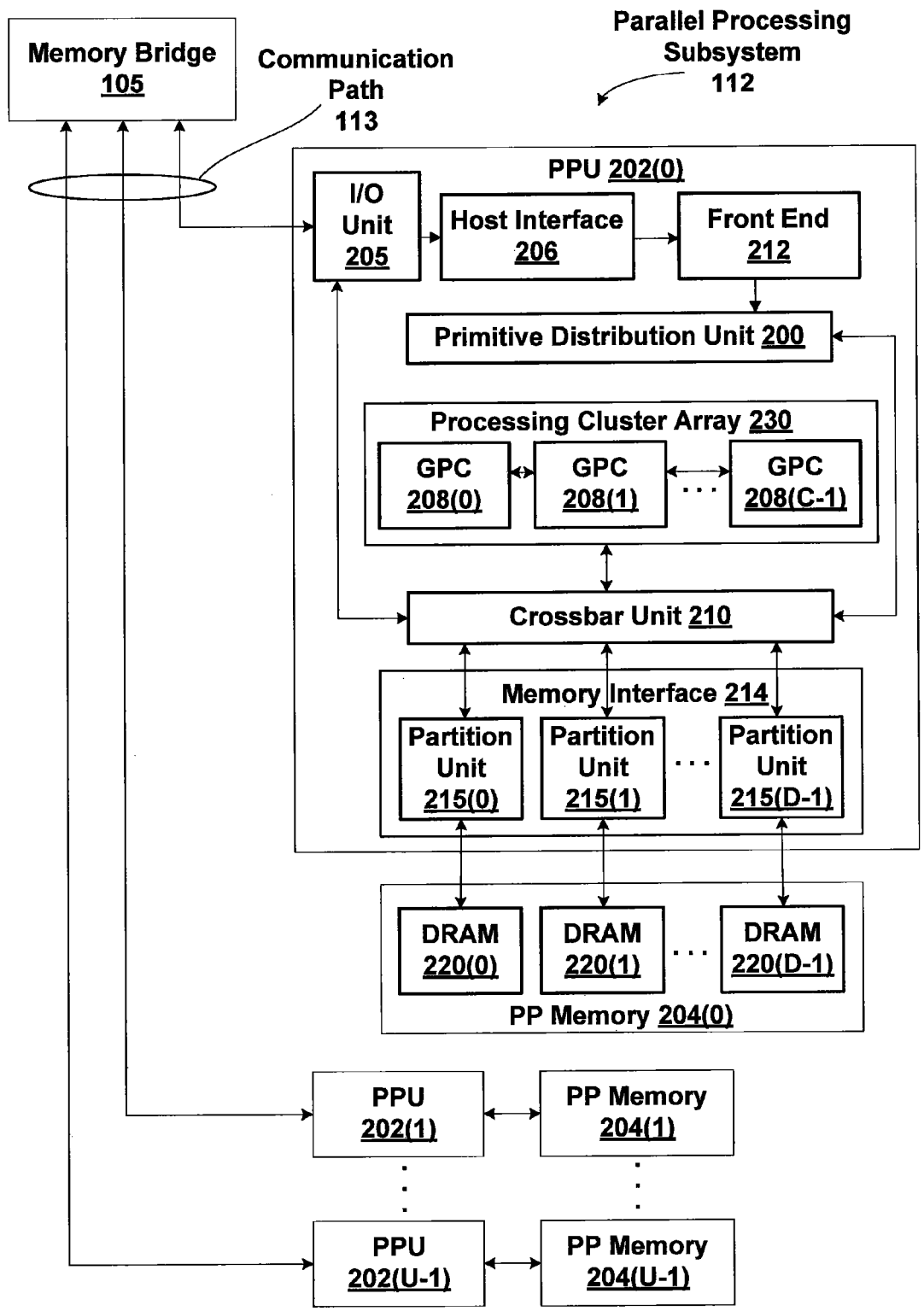
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D 1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
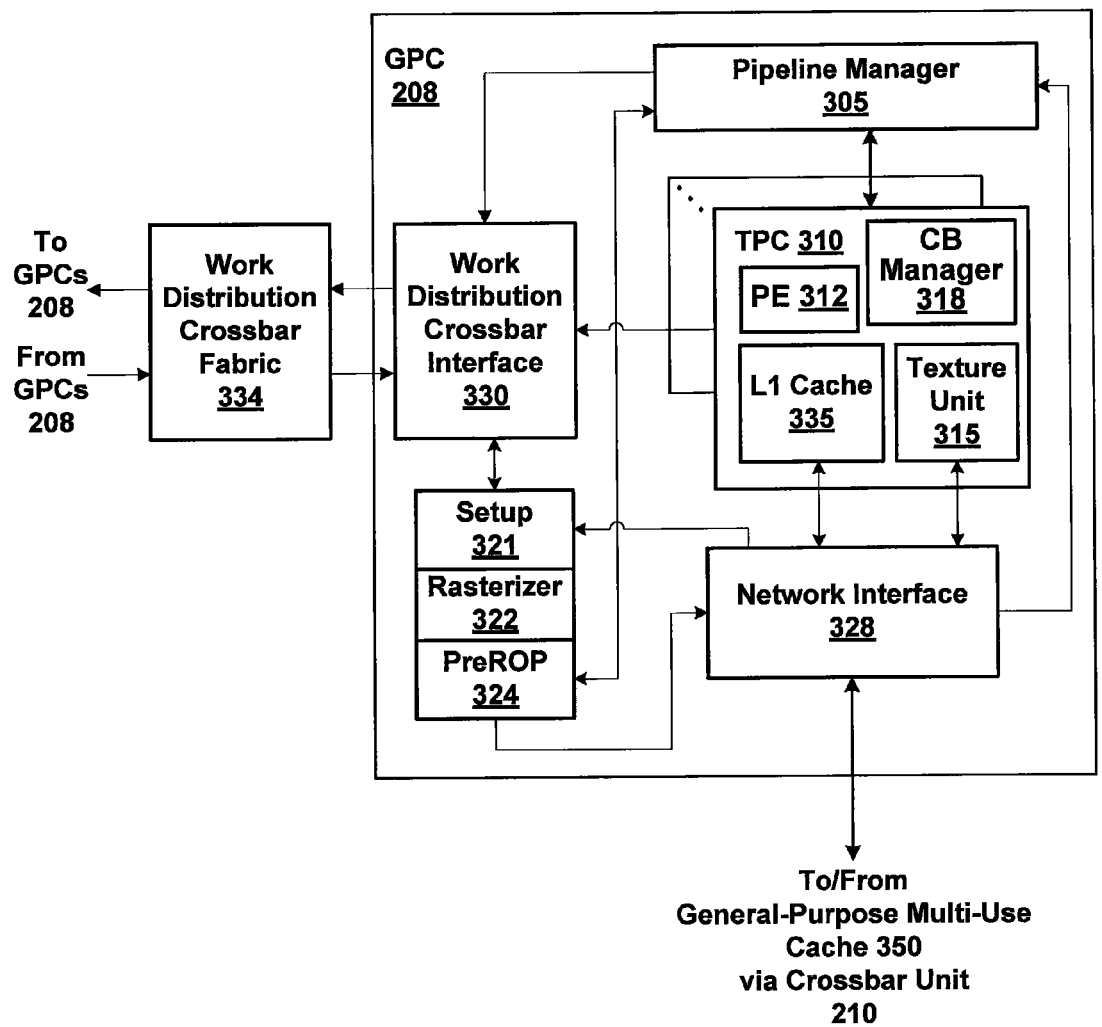
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≥1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to general-purpose multi-use caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute surface data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from a general-purpose multi-use cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in a general-purpose multi-use cache, parallel processing memory 204, or system memory 104 via crossbar unit 210.

In addition to the stream of object-space processed primitive descriptors, each TPC 310 also produces a stream of primitive attribute circular buffer entries (CBEs). Associated with each TPC 310 is a circular buffer, which is effectively a FIRO (first-in, random-out) buffer, in which primitive attribute data are stored. Each circular buffer has a fixed-size virtual memory allocation in which the data is stored. Circular buffers are also used to store other data, such as constants and state information. Each TPC 310 may also include a circular buffer (CB) manager 318 that is configured to operate in conjunction with the work distribution process to allocate, track, release, and invalidate circular buffer entries for storing primitive attribute data that is transferred between the GPCs 208. The functions of the CB manager 318 are described in conjunction with FIGS. 6A, 6B, 7A, and 7B. A primitive engine (PE) 312 within each TPC 310 is configured to interpolate primitive attributes prior to pixel shading. The PE 312 issues requests to the CB manager 318 when a CBE is needed to store primitive attribute data for a batch of primitives received from the primitive distribution unit 200.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Distributed Object-Space Processing

The application program presents graphics primitives to the parallel processing subsystem 112 serially via the host interface 206. The graphics primitives may be in the form of indexed lists, stored in memory. A rendering "drawcall" is sent serially over the host interface 206 and each drawcall may reference a large list of primitives to be rendered. An important design consideration is the granularity of distributing the primitives to the TPCs 310 for object-space processing. For best load balancing, a fine-grained distribution of individual primitives to the TPCs 310 is desired. However, since primitives are generally encoded as indexed triangle meshes or triangle strips, with vertices shared among multiple triangles, it is advantageous to distribute primitives in multiple-primitive batches, such that triangles that share a vertex are generally in the same batch.

In some embodiments the primitive distribution unit 200 reads a buffer containing indices of vertices in an associated vertex buffer. The indices implicitly define primitives and point to vertex data stored in the vertex buffer. The primitive distribution unit 200 groups the primitives represented by the indices of vertices into batches for distribution to the TPCs 310. The batch encodes a number of sequential primitives represented as a set of vertex indices and primitive topology information, e.g., a list of primitives (either points, lines, triangles, or patches) that reference indices in the set of vertex indices. Batches may include 32 vertex pointers, which is large enough to benefit from vertex reuse, but small enough to balance the parallel geometry processing workload across the TPCs 310 while minimizing buffering needed to store the primitives for processing. The batches may be assigned to the TPCs 310 in the system in a round-robin fashion or based on the current loading conditions for object-space primitive processing. The object-space primitive processing comprises geometry processing, including world-to-screen-space transformation, clipping, culling, and vertex shading operations. The result of the parallel object-space primitive processing performed by the TPCs 310 is batches of graphics primitive descriptors that encode transformed vertices defining points, lines, and triangles. The primitive descriptor contains information about the geometric primitive necessary for rendering the pixels covered by the primitives: type of primitive (point, line, triangle), vertex indices that point to buffers storing the vertex attributes, control flags.

The vertex attributes are transferred from the TPCs 310 to the distributed general-purpose multi-use cache via the network interface 328 and stored in one or more circular buffers. The vertex attributes may then be read from the circular buffers by any of the TPCs 310 that are configured to perform rasterization of the object-space processed primitives.

Distributed Screen-Space Processing

Primitive setup and rasterization are also parallelized over the GPCs 208. Each GPC 208 includes a setup 321, rasterizer 322, and preROP 324. Each GPC 208 is responsible for processing a portion of the screen-space. It is desirable to distribute rasterization in screen-space portions so that shading, texturing, and frame buffer accesses have locality and rasterization of the primitives in each portion may be performed in parallel and independently.

The object-space processed primitive descriptors and circular buffer entry addresses are routed through the work distribution crossbar fabric to GPCs 208 by the work distribution crossbar interface 330 based on the portion of the image that each object-space processed primitive affects. To make this assignment, the image, called the render target, is subdivided into small "screen tiles," and the screen tiles are partitioned into non-overlapping sets that cover the image. A different GPC 208 is assigned to each screen tile set. In one embodiment, each screen tile set includes statically mapped 16×16-pixel regions. The GPC 208 may by configured to perform setup and rasterization for up to one triangle per clock. A given GPC 208 is configured to rasterize each primitive that touches at least one pixel within the portion of the screen-space assigned to the given GPC 208. Large primitives may be rasterized by every GPC 208 while a small primitive may only be rasterized by one GPC 208.

Setup 321 forwards the edge and depth plane equations for object-space processed primitives to the rasterizer 322. Setup 321 stores partial plane equations in a buffer for subsequent retrieval by the fragment shader, when interpolating other attributes. The rasterizer 322 associated with each setup 321 iterates within the primitive bounding box, guided by the edge equations, to identify tiles with sample coverage. The rasterizer 322 contains a coarse stage, which identifies large tiles that could contain sample coverage and a fine stage, which tests sample locations against edge equations. In one embodiment, the rasterizer 322 uses knowledge of the GPC screen tile mapping to skip over tiles assigned for processing by other GPCs 208. In some embodiments, a hierarchical Z unit which can rapidly reject tiles that are known to lie behind occluding geometry is included between the two rasterizer stages.

The combination of the work distribution crossbar interface 330 and work distribution crossbar fabric 334 implements a distributed sorting structure that routes primitive data between the GPCs 208. The work distribution crossbar interface 330 routes the parallel streams of object-space processed primitive descriptors and circular buffer entry addresses from the TPCs 310 performing object-space processing into parallel, ordered streams of primitive descriptors for the GPCs 208 performing screen-space processing via the work distribution crossbar fabric 334. Multiple work distribution crossbar interfaces 330 are coupled together through the work distribution crossbar fabric 334 in order to support multiple GPCs 208. Each work distribution crossbar interface 330 receives a stream of object-space processed primitive descriptors from each TPC 310 that performs object-space processing and routes each object-space processed primitive descriptor to one or more GPCs 208 for screen-space primitive processing via the work distribution crossbar fabric 334. Each work distribution crossbar interface 330 then reorders the primitive descriptors received by each GPC 208 that will perform the screen-space processing to match the API primitive ordering. Since each GPC 208 does not process every primitive, some of the primitive descriptor streams reordered by the GPCs 208 will not include every primitive descriptor that is present in the API primitive ordering. A reordered stream is considered to match the API primitive ordering when the primitive descriptors that are present in the reordered stream are in the same order that the same primitive descriptors appear in the API primitive ordering.

Although the object-space processed primitives are reordered by the work distribution crossbar interface 330 into the API primitive order going to each rasterizer 322, the actual processing of the primitives is physically distributed. That is, there is no single point after primitives pass through the primitive distribution unit 200 through which all primitives flow. Importantly, this distributed implementation of primitive distribution permits the system to distribute multiple primitives per clock, up to a peak rate of a primitive per clock at each rasterizer 322 within a GPC 208. Each setup 321 receives a stream of processed primitives that possibly can affect one or more of its screen tiles. The rasterizers 322 proceed to generate pixel or sample data for their assigned tile sets. Each rasterizer 322 operates independently of the others. There is no need for the rasterizers 322 to stay synchronized with each other, since each one operates on its own separate subset of the image, and thus they are non-interfering.

The rasterized and then shaded fragment data produced by a rasterizer 322 and TPC 310 is collected by the pipeline manager 305 and output to the preROP 324. PreROP 324 is configured to receive the shaded fragment data (screen-space processed primitives) from TPC 310, direct the shaded fragment data to the ROP units within partition units 215, and perform optimizations for color blending, organize pixel color data, and perform address translations.

The overall primitive processing rate may reach up to C triangles per clock, where C is the number of GPCs 208. Therefore the primitive descriptors need to be conveyed to the GPCs 208 through the work distribution crossbar fabric 334 by the work distribution crossbar interface 330 at an aggregate rate of C triangles per clock—C * the input rate of an individual GPC 208. Because the parallel processing subsystem 112 is scalable, systems with higher performance may be built by increasing the number of GPCs 208 and/or TPCs 310 in the parallel processing subsystem 112.

Figure 3B:
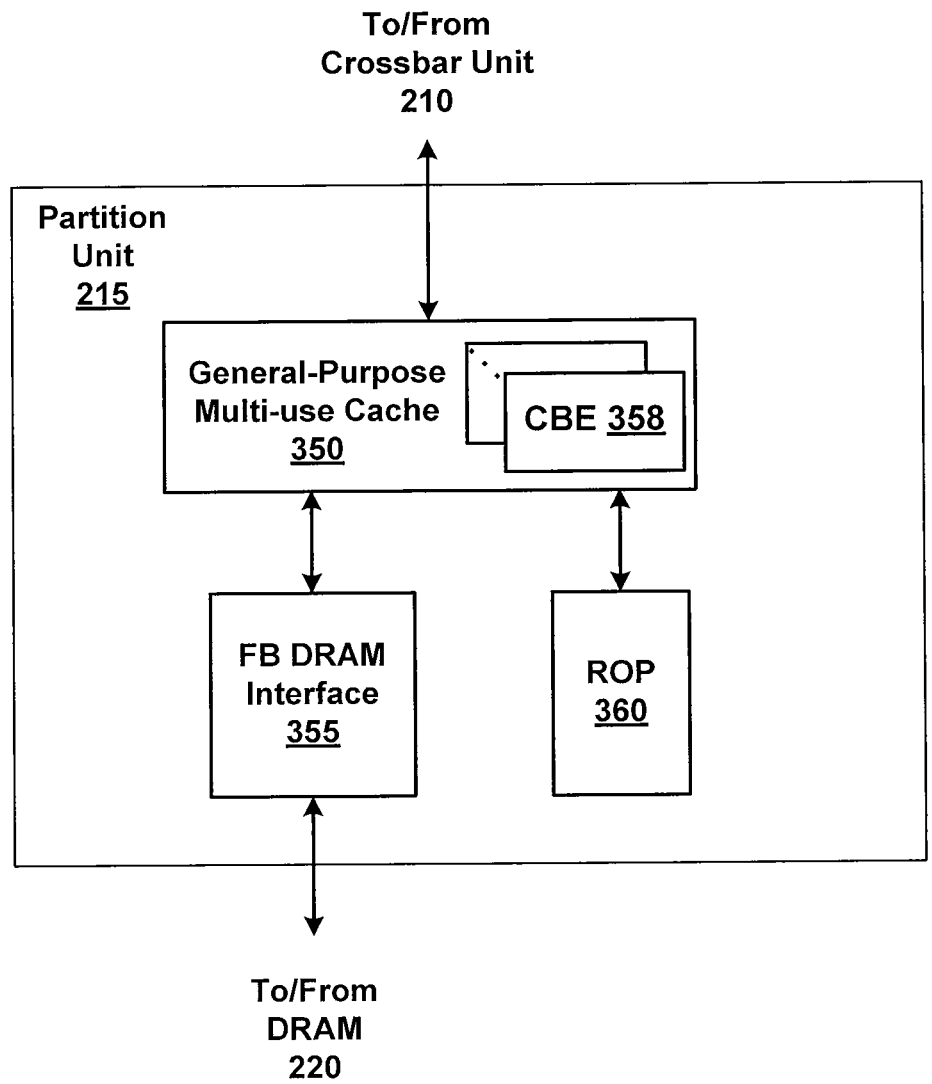
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a general-purpose multi-use cache 350, a frame buffer (FB) DRAM interface 355, and a raster operations unit (ROP) 360. general-purpose multi-use cache 350 is a read/write cache that is configured to perform load and store operations received from crossbar unit 210 and ROP 360. Read misses and urgent writeback requests are output by general-purpose multi-use cache 350 to FB DRAM interface 355 for processing. Dirty updates are also sent to FB 355 for opportunistic processing. FB 355 interfaces directly with DRAM 220, outputting read and write requests and receiving data read from DRAM 220.

The general-purpose multi-use cache 350 may store entries of circular buffers, circular buffer entries (CBE) 358 that are configured to store primitive attribute data, constants and state information, and the like. The CB manager 318 allocates the CBE 358 to reside in the system shared general-purpose multi-use cache 350, although the general-purpose multi-use cache 350 may flush the CBE 358 to backing store if necessary. Normally CBEs 358 are assigned a high stickiness value in the general-purpose multi-use cache 350. More specifically, CBEs 358 are typically marked "evict last," which means CBE 358 will not be evicted from the cache until there is no lower priority data available for eviction. This treatment is useful because the First-In-Random-Out (FIRO) discipline of circular buffer accesses does not work well with the least-recently-used eviction policy used by the general-purpose multi-use cache 350. However, the stickiness value is programmable. In some embodiments, the circular buffers configured to store primitive attribute data may be given a lower, "evict normal" priority, because the primitive attribute reader is able to tolerate more latency compared with processing units reading other data from the general-purpose multi-use cache 350.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Figure 3C:
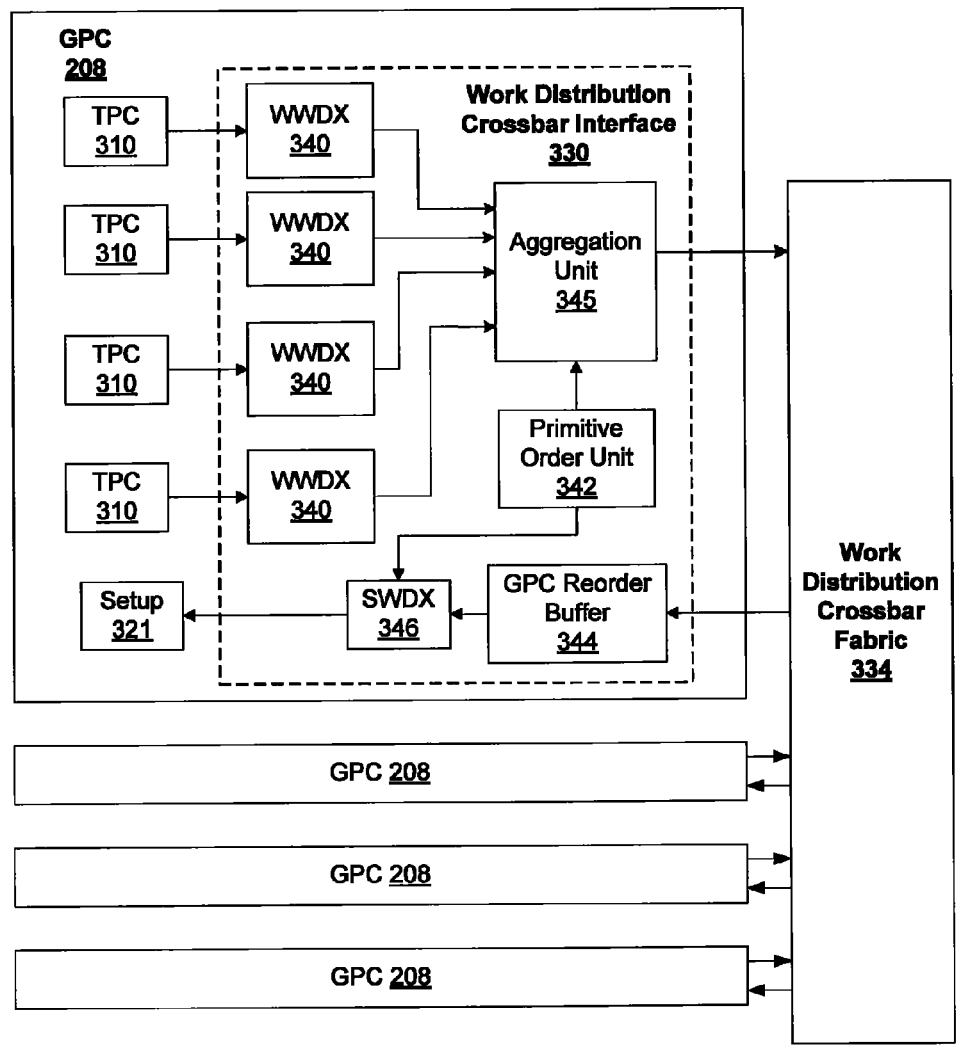
FIG. 3C is a block diagram of a portion of the work distribution crossbar of FIG. 3A, according to one embodiment of the present invention.

FIG. 3C is a block diagram of portions of the GPCs 208 including the work distribution crossbar interface 330 of FIG. 3A, according to one embodiment of the present invention. The work distribution unit 330 includes a set of WWDXes 340 which each are coupled to one of the TPCs 310 to receive the object-space primitive descriptors, primitive bounding boxes, attribute buffer addresses, and end of batch flags from the TPCs 310 within a GPC 208. The TPC 310 computes a primitive bounding box for each primitive descriptor and the WWDX 340 receiving the bounding box compares it with the screen-space tiled mapping of the GPCs 208. A primitive bounding box contains the minimum and maximum X and Y screen-space dimensions for the smallest rectangle that completely contains the primitive. Based on the bounding box size and position, the WWDX 340 determines which GPCs 208 might need to process the primitive by intersecting the screen tile set for each GPC 208 with the bounding box. The WWDX 340 sets bits corresponding to the particular GPCs 208 that should receive the primitive in a GPC (distribution) mask. Small primitives (i.e., primitives that affect only one or a few pixels) will generally affect only one screen tile, and thus will be sent to a single GPC 208. Larger primitives, which affect several screen tiles, will be sent to multiple GPCs 208. In the limit, with small primitives, when there are C GPCs 208, the system can process C different primitives concurrently.

The primitive descriptors for a single batch that is processed by a particular TPC 310 are processed and output by the TPC 310 in the API primitive order. However, the different TPCs 310 may process the batches at different rates so that the batches are output from the TPCs 310 in an order that does not match the API primitive order at a batch level. Therefore, an aggregation unit 345 reorders each batch that is received from the WWDXes 340 to match the API primitive order.

The aggregation unit 345 is configured to merge two or more primitive descriptor streams output by the WWDXes 340 and produce a single primitive descriptor stream that is routed by the work distribution crossbar fabric 334 to the GPCs 208 for object-space processing. In some embodiments, the aggregation unit 345 is omitted and the multiple streams of primitive descriptors are combined and output to the work distribution crossbar fabric 334 by the WWDXes 340 or the multiple streams of primitive descriptors are output directly (combined or not) to the work distribution crossbar fabric 334. The combining of the multiple streams may be performed in a variety of ways without regard to matching the API primitive order.

API primitive order information is provided to the aggregation unit 345 by the pipeline manager 305. When the primitive distribution unit 200 sends batches of primitives to TPCs 310 via the pipeline manager 305, the pipeline manager 305 outputs a sequential order of TPCs 310 that received the batches, so that the aggregation unit 345 within each work distribution crossbar interface 330 can reorder the object-space primitives to match the API primitive order and produce an ordered primitive stream for output to the GPCs 208 for screen-space processing. The pipeline manager 305 may also receive a sequential order of GPCs 208 that received the batches from the primitive distribution unit 200 and output the sequential order of GPCs 208, so that the SWDX 346 within each work distribution crossbar interface 330 can reorder the object-space primitives that are received by each GPC 208 to match the API primitive order and produce an ordered primitive stream for output to the setup 321 for screen-space processing.

The aggregation unit 345 performs the reordering on outgoing primitive descriptors by accepting primitive descriptors from the TPC 310 corresponding to a current TPC identifier (based on the sequential order provided by the pipeline manager 305) until an end of batch flag is detected in the primitive descriptor stream. When an end of batch flag is detected, the next TPC identifier in the sequential order becomes the current TPC identifier. The aggregation unit 345 outputs a stream of object-space processed primitive descriptors that is reordered based on the TPC identifiers. The stream output by each individual GPC 208 matches the API primitive order. However, each receiving GPC 208 (configured to perform screen-space processing) may receive primitive descriptors from one or more outgoing streams transmitted by GPCs 208 (configured to perform object-space processing). On the receiving side of the work distribution crossbar fabric 334, the sequence of GPC identifiers may be used by each SWDX 346 to reorder the batches received from different GPCs 208 so that each setup 321 receives an ordered list of the object-space processed primitive descriptors for rasterization.

The outgoing ordered stream of object-space processed primitives output by an aggregation unit 345 over the dedicated work distribution crossbar fabric 334 includes the following primitive data for each primitive: an attribute buffer address, a primitive descriptor, a GPC mask, a GPC identifier, and an end of batch flag. The GPC identifier indicates the GPC 208 that performed the object-space processing. The attribute buffer address is a pointer to a circular buffer 358 where the attribute data for the primitive is stored. When many attributes are associated with each primitive, it is advantageous to carry a pointer to the attribute data through the work distribution crossbar interface 330 rather than carrying the actual attribute data. When the WWDXes 340 output multiple primitive streams directly to the work distribution crossbar fabric 334, i.e., the aggregation unit 345 is omitted, the primitive stream includes the GPC mask, a TPC identifier, a GPC identifier, and an end of batch flag. The TPC identifier indicates the TPC 310 that performed the object-space processing.

The work distribution crossbar fabric 334 routes primitive data for one primitive from a GPC 208 configured to perform object-space processing to one or more GPCs 208 configured to perform screen-space processing based on the GPC mask. In some embodiments each primitive is broadcast to each GPC 208 according to the GPC mask in a single clock cycle.

In other embodiments, a primitive is output to only one GPC 208 in a clock cycle so that a primitive that is routed to multiple GPCs 208 is output to each one of the different GPCs 208 in a separate clock cycle. The work distribution crossbar fabric 334 may be configured to use a credit/debit scheme to transmit primitive data between the GPCs 208. A receiving GPC 208 outputs credits indicating the amount of primitive data that can be accepted. The work distribution crossbar fabric 334 may also be configured to arbitrate between two or more primitives that are routed to the same GPC 208 in a clock cycle when a GPC 208 can only accept one primitive per clock cycle.

Each screen-space unit 336 has a GPC reorder buffer 344 that receives and stores the primitive data (excluding the GPC mask and GPC identifier) output by the work distribution crossbar fabric 334. The GPC reorder buffer may be implemented as a multithreaded FIFO for storing the primitive data with one thread per object-space GPC 208. In other embodiments separate FIFOs may be used for each object-space GPC 208. Primitive data are placed in the appropriate thread, based on the GPC identifier, as the primitives are received via the work distribution crossbar fabric 334. In embodiments that omit the aggregation unit 345, primitive data are placed in the appropriate thread, based on the TPC identifier (and the GPC identifier if the TPC identifiers are not unique across the different GPCs 208), as the primitive data are received via the work distribution crossbar fabric 334.

The SWDX 346 removes the primitive descriptors, attribute buffer addresses, and end of batch flags from the multithreaded FIFO in the order specified by the sequential GPC identifier order provided by the pipeline manager 305 and pushes the primitive descriptors and attribute buffer addresses into an output FIFO. The SWDX 346 starts reading primitive descriptors, attribute buffer addresses, and end of batch flags from the FIFO thread for the first GPC that received a batch of primitive data. When the SWDX 346 sees the end of batch flag set in that FIFO thread, the SWDX 346 starts reading from the FIFO thread of the next GPC 208 that received a batch of primitives for object-space processing, and so forth. Thus, the SWDX 346 pulls primitive descriptors and circular buffer entry addresses out of the multithreaded FIFO in the API primitive order, and pushes them into the output FIFO within the SWDX 346 in the API primitive order. The setup unit 321 in the respective GPC 208 pops the primitive descriptors and circular buffer entry addresses from the output FIFO for screen-space processing. The output FIFO should be deep enough so that the setups 321 are not starved when many primitives are sent to the same setup 321. In some embodiments each rasterizer 322 can process up to a primitive per clock, matching the rate at which primitive descriptors are output by the setup unit 321.

The assignment of screen tile sets to the rasterizers distributes the rasterization workload. The screen tiles are N×M rectangles of samples within the render target. The choice of tile size is a tradeoff between load balancing, which improves with smaller screen tiles, and overhead, which improves with larger screen tiles. Overhead can take the form of primitives that need to be processed by multiple GPCs 208 because the tile size is too small or reduced texture locality. In one embodiment, the tile size is 16×16 pixels. The screen tiles are assigned to rasterizers 322 in an interleaved fashion to balance the workload across the rasterizers 322. For example, the upper-left corner tiles of the render target might be assigned to four rasterizers 322 corresponding to digits 0, 1, 2, and 3, in the following fashion:

| | |
|---|---|
| First tile row: | 0 1 2 3 0 1 2 3 0 1 2 3 . . . |
| Second tile row: | 1 2 3 0 1 2 3 0 1 2 3 0 . . . |
| Third tile row: | 2 3 0 1 2 3 0 1 2 3 0 1 . . . |
| Fourth tile row: | 3 0 1 2 3 0 1 2 3 0 1 2 . . . |

The exact pattern of tile assignments may be specified by a table or calculated algorithmically, and may vary between different systems. One embodiment uses a skewed, interleaved arrangement, as shown above, with the property that if a primitive bounding box is at least C (C=number of rasterizers 322) screen tiles wide or tall, the primitive must necessarily be distributed to all rasterizers 322. This characteristic may be used to simplify the calculation of the GPC mask.

Graphics Pipeline Architecture

Figure 4:
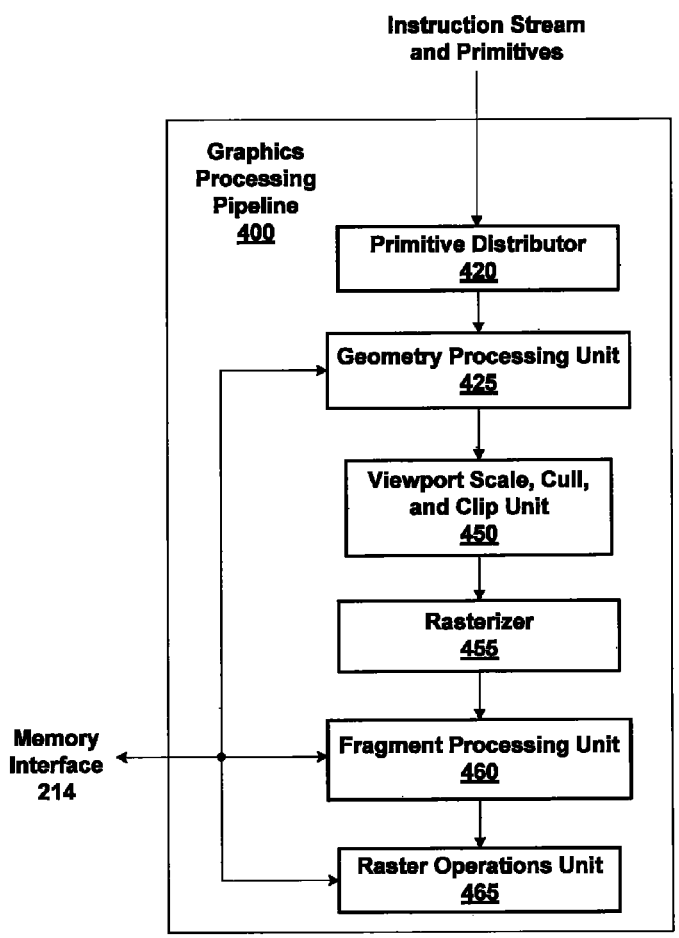
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced. The API primitive ordering may be restored prior to object-space processing of the primitives by either using the same TPCs 310 to perform the object-space processing as was used to perform the tessellation. Alternatively, the primitive batches may be reordered to match the API primitive order after tessellation so that batches of primitives for object-space processing are generated and distributed in API primitive order.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

The bulk of the data transferred (via indices) between geometry processing and rasterization is vertex attributes. These are the parameters calculated for each vertex, such as x, y, z position, texture coordinates, vertex colors, and other shader parameters. Some parameters, such as x, y, z (position) are needed by the rasterizer to determine primitive coverage and depth values. Other attributes are needed, as interpolated values, by the fragment shader. The number and type of attributes depends on the vertex and fragment shaders.

Vertex attributes need to be buffered from the time they are calculated by the TPCs 310 doing object-space processing until they are needed by setup 322 or the fragment processing unit 460. The amount of data that needs to be buffered is highly variable, depending on the number and type of attributes per vertex. The amount of data may be near zero for full-screen primitives and the amount of data may be extremely high in high primitive rate cases. The amount of data may also be highly variable per GPC 208 when a large number of small primitives fall onto a single screen tile.

Because of these potentially large and highly variable buffering requirements, it may be advantageous to store vertex attributes in the general-purpose multi-use cache 350. The general-purpose multi-use cache 350 is a large, pooled resource that is used for many purposes: caching textures, caching rendered pixels, and caching primitive attributes. In high triangle rate cases a greater amount of attribute buffering is needed, so the bulk of the general-purpose multi-use cache 350 may be used to cache (primitive and vertex) attribute data instead of texture data. When requirements for attribute buffering are low, the general-purpose multi-use cache 350 may be used primarily for caching texture data.

Each TPC 310 performing object-space processing is provided with a fixed size linear buffer that is virtually addressed and cacheable. The addresses used to access these linear buffers wrap, so the linear buffers are actually circular FIFO (first-in, first-out) buffers. As TPCs 310 stream vertex attributes into the circular buffers, the TPCs 310 provide indices for entries written to the work distribution crossbar interface 330, which are conveyed to the GPCs 208 performing the screen-space processing. GPCs 208 that need to read circular buffer entries (CBEs) do so at two points: setup and fragment shader interpolation. Entries that are unneeded by a GPC 208 are skipped—not read by the GPC 208, while other entries may be read by multiple GPCs 208.

Because virtual addressing is used for the circular buffers, the full circular buffer may always be allocated, but only cache lines storing valid data need be resident in the general-purpose multi-use cache 350. As previously described, when CBEs 358 are written to the general-purpose multi-use cache 350, the cache line may be marked with "no-evict" status, so the cache line storing attribute data will not be flushed from the general-purpose multi-use cache 350. The CB manager 318 also has the task of freeing CBEs 358 when the GPCs 208 are finished with them. To achieve this, the rasterizers 322 track the CBEs 358 through the screen-space processing and signals the CB manager 318 when a CBE 358 may be invalidated. The work distribution crossbar interface 330 keeps a reference count per CBE 358 of how many screen-space pipelines (where a screen-space pipeline includes the setup 321, rasterizer 322, PreROP 324, and TPCs 310) are using the CBE 358. When this reference count for a particular CBE 358 goes to zero, the work distribution crossbar interface 330 may signal the CB manager 318 to invalidate that CBE 358.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Figure 5:
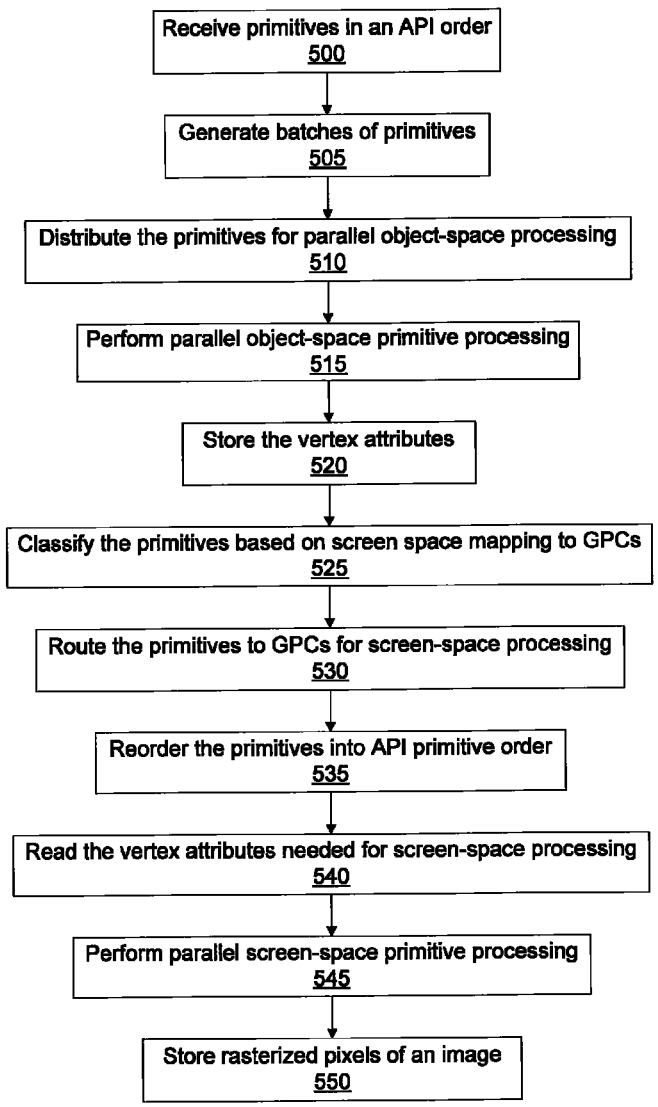
FIG. 5 is a flow diagram of method steps for rendering primitives while maintaining API primitive ordering, according to one embodiment of the present invention.

FIG. 5 is a flow diagram of method steps for rendering primitives while maintaining API primitive ordering, according to one embodiment of the present invention. Although the method steps of FIG. 5 are described in conjunction with the systems of FIGS. 1, 2, 3A, 3B, and 3C, persons skilled in the art will understand that any system configured to perform the method steps, in any order, is within the scope of the inventions.

At step 500 the primitives are received by the primitive distribution unit 200 in an API primitive order. At step 505 the primitive distribution unit 200 generates primitive batches of the primitives for parallel object-space (geometry) processing by the TPCs 310. For each primitive batch a TPC 310 receives attribute buffer addresses of vertex buffers and the primitive descriptors that each include the primitive type (triangle strip, triangle mesh, line, and the like), flags, and indices of vertices. The TPC 310 uses the attribute buffer addresses and indices to calculate the addresses of the vertex attributes. The TPC 310 loads vertex attributes from external memory via the general-purpose multi-use cache 350 and crossbar unit 210. A TPC 310 only fetches attributes once per batch, regardless of the number of primitives in the batch that refer to the vertex. Some vertices may be referenced by primitives in multiple batches processed on different TPCs 310. The vertex data will be fetched separately by each TPC 310 over the crossbar unit 210, but the general-purpose multi-use cache 350 will usually retain the vertex data from the first reference, so vertex data is typically fetched from the external memory only once.

At step 510 the primitive distribution unit 200 distributes batches of the primitives for parallel geometry processing by the TPCs 310. At step 515 the TPCs 310 perform object-space processing on the primitives to produce streams of object-space processed primitives. The time to process one vertex is independent of how large the primitive appears on the screen. By distributing geometry processing in vertex batches, the processing load is distributed across the GPCs 208.

At step 520 the TPCs 310 write the vertex attributes that are produced by the object-space processing of the primitives into a circular buffer of the general-purpose multi-use cache 350 via the network interface 328. In some embodiments, the TPC 310 also computes the bounding box of each non-culled primitive and outputs the bounding box with the primitive descriptor and attribute buffer address to the corresponding WWDX 340 within the work distribution crossbar interface 330.

At step 525 a GPC mask is computed for each primitive to classify each primitive based on the screen tile mapping to the GPCs 208. At step 530 each primitive is routed by the work distribution crossbar interface 330 through the work distribution crossbar fabric 334 to the GPC(s) 208 that are indicated by the GPC mask for screen-space processing. Note that multiple streams of object-space processed primitives within a single GPC 208 may be merged by the aggregation unit 345 before being output by the GPC 208. In that case, the primitives are reordered by the aggregation unit 345 to match the API primitive order.

At step 535 the primitives are reordered by SWDX 346 in the GPC 208 to match the API primitive order. At step 540 the vertex attributes needed for screen-space processing of the primitives are read by the setup 321 and TPCs 310 using the attribute buffer address received with each primitive descriptor.

At step 545 parallel screen-space processing of the reordered primitives is performed by the GPCs 208. The setup units 321 convert vertex attributes into plane equations describing polygon edges, depth values, and other parameters to be interpolated. Setup 321 also computes the primitive bounding box and initialization parameters for the rasterizer 322, and performs various culling operations such as backface and zero-area culling. Setup 321 receives primitive descriptors in API primitive order from the SWDX 346 within the work distribution crossbar interface 330. Each primitive descriptor is associated with an attribute buffer address, i.e., a pointer to the processed vertex attribute data stored in circular buffers in the general-purpose multi-use cache 350. Setup 321 requests x, y, z position attributes, which are common for all primitives a given type, regardless of the number of additional vertex attributes. When these are returned from the general-purpose multi-use cache 350 via the crossbar 330, setup 321 computes edge and partial plane equations for the primitive. Final plane equations for each attribute are computed and loaded into a plane-equation RAM that is readable by a fragment shader program that is executed by the streaming multiprocessors within each TPC 310. At step 545 the rasterizer 322 iterates within the primitive bounding box, guided by the edge equations, to identify screen tiles with sample coverage. Rasterizer 322 rasterizes the primitive pixels that lie within the screen-space tile(s) for which the GPC 208 is responsible. The rasterizer 322 advantageously skips over screen tiles that are assigned to other rasterizers 322. In some embodiments the rasterizer 322 is configured to skip over screen tiles in zero time.

The TPCs 310 also execute parallel fragment shaders at step 545. In some embodiments, attributes are only evaluated when requested by the fragment shader allowing interpolation to be performed at any desired x,y location within the pixel, and need not be the same location for each pixel. When an interpolation instruction is executed by the fragment shader, the corresponding plane equation is read from the plane-equation RAM, evaluated at the designated (x,y) location, and division by w performed. A given attribute can be referenced any number of times within a fragment shader program at any desired (x,y) sample location. Attributes that are not requested are not evaluated.

The fragment shader may perform texture, math, or other operations, read or write registers, and read or write global memory. The fragment shader stores its results in color (and optionally z) output registers. Shader output logic pulls final colors from the shader output registers and sends them to ROPs 360 associated with the frame-buffer partitions over the crossbar unit 210. At step 550 the rasterized pixels of an image are output and stored.

The crossbar unit 210 need not maintain ordering among all data packets. The crossbar unit 210 does need to ensure that all data from a particular GPC 208 to a particular ROP 360 is conveyed in order, which it may do using deterministic routing or other methods known to those skilled in the art.

Parallel rendering enables the rendering of multiple primitives per system clock. Object-space primitive processing workload (geometry processing) is distributed across multiple processing cores in order to enable the rendering of multiple primitives per system clock. The object-space processed primitives are distributed across a work distribution crossbar for parallel rasterization. The object-space processed primitives are reordered by the parallel rasterizers to restore the API primitive order before the primitives are rasterized.

Hardware-Managed Circular Buffers

The key idea is to store primitive attributes in the shared general-purpose multi-use cache 350 in buffers called circular buffers (CBs). Primitive attributes are application-supplied or vertex-shader-calculated values associated with primitive vertices, for example, color values, texture coordinates, normal vectors, etc. In addition, values calculated by vertex shaders may be stored as primitive attributes. These attributes are used as input by pixel shaders and interpolators in the rasterization phase. Some embodiments may permit up to 128 attributes to be associated with each vertex. Circular buffers are also used to store task attributes when the system is redistributing processing workloads between GPCs 208. Task attributes are attributes that are passed between shaders in object-space processing, for example between vertex and geometry shaders. The amount of address space that is allocated to store primitive and/or task attributes is fixed in virtual space and physical backing storage space, but not fixed in the amount of the general-purpose multi-use cache that each circular buffer occupies. This allows for more other data to be stored in the general-purpose multi-use cache when a circular buffer size is smaller and less other data when the circular buffer size is larger.

In the following we discuss primitive attribute handing, but the same techniques are used for task attribute handling, with minor exceptions as noted. By using the general-purpose multi-use cache 350 for attribute storage, the architecture avoids the requirement for a large, dedicated buffer. In general, the space requirement for attribute storage is highly variable, depending on the number of attributes and the size of primitives. The shared general-purpose multi-use cache 350 may also store texture data and pixel data. A benefit of sharing the general-purpose multi-use cache 350 by storing primitive attribute data is that when rendering at high triangle rates, a comparatively large amount of space is needed for primitive attributes, while much less space is needed for texture data and pixel data since the primitives tend to use less texture data and complex shading. In contrast, when larger primitives are rendered (at a correspondingly lower triangle rate), the space needed to store primitive attributes is reduced, but the space needed for texture and pixel data is increased. Thus, the total memory requirements are lower when the general-purpose multi-use cache 350 is used to store primitive attribute data, texture data, and pixel data than would be the case with a separate, maximum-sized dedicated memory for primitive attribute data.

When a CBE 358 is allocated for a batch, the address of the CBE 358 is sent to work distribution crossbar interface 330 along with the primitive descriptors, to be forwarded to the rasterizers 322. The primitive attribute data is read in two different units: the setup 321 needs the XYZ position attributes and some flags, and the PE 312 needs the other attributes in order to interpolate them for use in the pixel shaders. Once allocated, a CBE 358 stays at the same address in the circular buffer of a TPC 310 until the screen-space processing elements, e.g., rasterizer 322, setup 321, and pre-ROP 324 are done with using the primitive attribute data stored in the CBE 358. CBEs 358 are allocated at increasing addresses within the circular buffer until the end is reached, then the allocation sequence wraps around to restart at the beginning address of the circular buffer. CBEs 358 are freed when all of the screen-space processing elements that consume the primitive attribute data; more detail about the freeing process is provided in conjunction with FIG. 7B. Because the CBEs 358 are stored in the shared general-purpose multi-use cache 350, only one copy of each CBE 358 is needed, even though several, possibly all, of the screen-space processing elements access the data. An important advantage of using the general-purpose multi-use cache 350 to hold the circular buffers is load balancing. The general-purpose multi-use cache 350 is spread across multiple FB partition units 215. The virtual addresses of the CBEs 358 are reordered by the virtual-to-physical address mapping such that the CBEs 358 are evenly distributed across all the FB partition units 215. At system initialization, the CB manager 318 assigns a portion of the overall virtual memory space for circular buffers to each TPC 310.

The CBEs 358 are generated in the PE 312 in a structure-of-arrays (SOA) format. That is, all the instances of a given attribute are stored contiguously. This allows for efficient fetching by the PE units 312, since the data may be loaded in one or a few wide read requests. There is a CB manager 318 per TPC 310, which communicates with the PE 312 and with the work distribution crossbar interface 330 in that TPC 310. The PE 312 makes an allocation request when the PE 312 needs a new CBE 358. The CB manager 318 responds with a CBE address and tag. The CBE address and tag are forwarded on to the work distribution crossbar interface 330 by the PE 312 with the batch of primitives for which the CBE 358 contains the primitive attribute data.

The PE 312 reformats the processed attributes of non-culled vertices into Array of Structures (AOS) format needed by the setup 321. The PE 312 then writes the processed attributes via the work distribution crossbar fabric 334 into a portion of the circular buffer that is identified by the CBE address for access by the setup 321. The portion of the circular buffer, read by the setup 321, is organized in AoS format and contains the xyzw attributes, e.g, (xyzw, xyzw, . . . ). The CBE address is needed by the setup 321 and the PE 312 in order to read the CBE 358 later. The CBE tag is used to identify a CBE 358 for eventual release, when all of the readers of that CBE 358 have finished with the CBE 358. When a CBE 358 is allocated, the work distribution crossbar interface 330 creates a reference count associated with the CBE tag for the screen-space processing elements that will need to read the CBE 358, e.g., setups 321. This might be one setup 321 for a small primitive or all setups 321 for a large primitive, or any number in between. Similar reference counts are used to track reading of the CBE 358 by the PEs 312. As the screen-space processing elements complete processing the CBE 358, CBE done messages are sent back to work distribution crossbar 330, which decrements the reference count. When the reference count reaches zero, the CBE 358 is no longer needed, and the area allocated for the CBE 358 within the general-purpose multi-use cache 350 may be invalidated. Within each rasterizer a similar reference counting scheme is used, so that the rasterizer can generate a CBE done report message and send the CBE done back to the work distribution crossbar interface 330 that owns the CBE 358. It is advantageous to invalidate the allocated area so other units may use the portions of the general-purpose multi-use cache 350 not needed for CBEs 358. Additionally, invalidating the allocated area also prevents the general-purpose multi-use cache 350 from attempting to write the data stored in the CBE 358 to memory when the cache entries are marked as dirty.

When the primitive distribution unit 200 distributes the task attributes for processing, the task attributes are read by the primitive distribution unit 200 rather than by the screen-space processing elements, however the same reference counting mechanism may used in the CB manager 318 and the work distribution crossbar interface 330. The only difference is that the CBE done messages come from the PE 312 instead of the rasterizer 322. CBEs 358 are invalidated as soon as their reference count reaches zero so that the space in the general-purpose multi-use cache 350 that is occupied by the CBE 358 is available for other uses. However, the CBEs 358 are released (made available for re-use by CB manager 318) in an oldest-first order. So a CBE 358 may be invalidated a considerable time before it is eventually released. A CBE 358 is released when both its reference count is zero and the CBE 358 is the oldest, i.e, allocated earlier than the other CBEs 358. By releasing only the oldest CBE 358, memory management is simplified. In one embodiment, CBEs other than the oldest CBEs are released, and a general-purpose memory manager is capable of splitting and coalescing blocks.

Figure 6A:
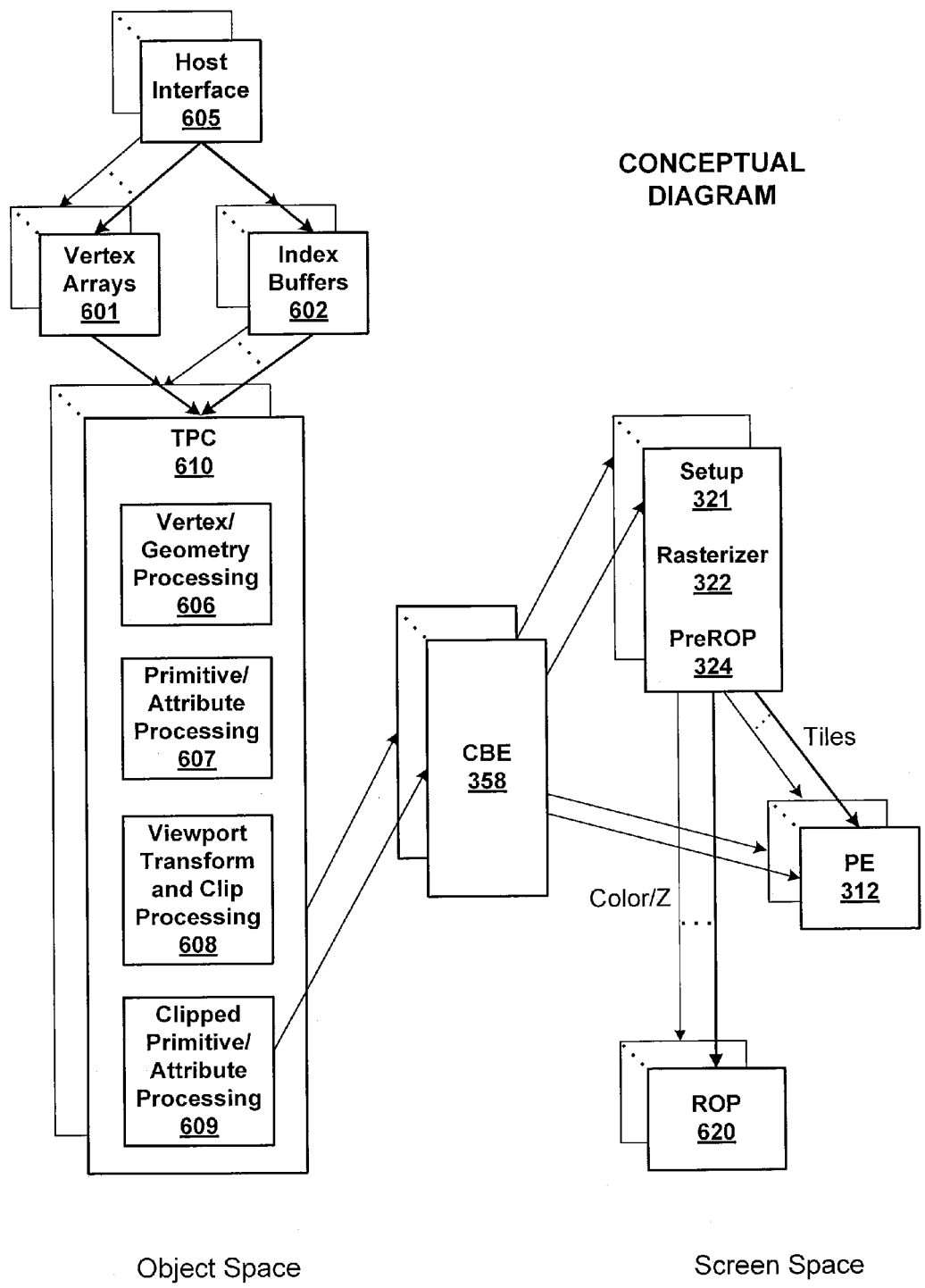
FIG. 6A is a conceptual diagram of the graphics processing, according to one embodiment of the present invention.

FIG. 6A is a conceptual diagram of the graphics processing, according to one embodiment of the present invention. A host interface 605 reads a pushbuffer to obtain processing work. The work is then divided into batches for processing by the GPCs 208. The index buffers 602 are pointers to primitive index lists stored in memory. The entries in these index lists point into lists of vertex attributes, also stored in memory as vertex arrays 601. The batches are distributed to PEs 312 for object space processing. Within each PE 312 various processing operations are performed, such as, vertex/geometry processing 606, primitive/attribute processing 607, viewport transform and clip processing 608, and clipped primitive/attribute processing 609. The functions of primitive/attribute processing 607, viewport transform and clip processing 608, and clipped primitive/attribute processing 609 may be performed by the viewport scale, cull, and clip unit 450 shown in FIG. 4. The clipped primitive/attribute processing 609 operation writes the primitive attributes to the CBEs 358 (not shown in FIG. 6A).

The work distribution crossbar interface 330 and the work distribution crossbar fabric 334 (not shown) provide a connection between the object-space processing and the screen-space processing. Specifically, the work distribution crossbar interface 330 and the work distribution crossbar fabric 334 distribute the multiple primitive streams (primitive descriptors, CBE addresses, and tags) to the multiple screen-space processing element groups that including, setup 321, rasterizer 322, preROP 324, PE 312, and the ROP 620. As previously explained the global API primitive order is maintained and each one of the screen-space processing element groups is responsible for a portion of the screen pixels.

The primitive attribute data in the CBEs 358 are read by the setup 321. The preROP 324 outputs tiles to pixel shaders executing in the GPC 208 and color and z (depth) data to ROP 620. The PE 312 also reads the primitive attribute data from the CBEs 358. When the PE 312 has completed reading a particular CBE 358 during execution of a pixel shader, that CBE may be released and invalidated by the CB manager 318.

The primitive attributes are read from the CBE 358 by the setup 321 (reads the XYZ position attributes) and the PE 312 for pixel shading (primitive attribute interpolation). When a primitive flows through the rasterizer 322, the primitive may cover multiple screen tiles. These screen tiles are the basic processing unit the preROPs 324 operate on. The CBE address and CBE tag is maintained for each primitive in the tile. A tile coalescer unit within each rasterizer 322 keeps a tile count for any CBEs 358 that are referred to by a screen tile. As the screen tile is processed, the PE 312 reads the primitive attributes needed by the pixel shader. The PE 312 signals the preROP 324 when a sub-tile is done being processed. The preROP 324 breaks each screen tile into one or more sub-tiles that are output to PEs 312 with the CBE address and CBE tag. PreROP 324 maintains a sub-tile count for each screen tile that is incremented when a sub-tile is output to a PE 312 and decremented with a sub-tile done is received from the PE 312. The preROP 324 sends a tile done message to the tile coalescer unit when all of the sub-tiles for a screen tile have been read by the PE 312, i.e., when the sub-tile count equals zero.

The tile coalescer unit gathers all tile done signals for a CBE 358 and decrements the tile count for the CBE 358. When the tile count goes to zero, the tile coalescer unit generates a CBE done message and sends the CBE done message to the work distribution crossbar interface 330 within the GPC 208 that includes the rasterizer 322. The work distribution crossbar interface 330 then forwards the CBE done message to the owner work distribution crossbar interface 330 via the work distribution crossbar fabric 334. The key to this routing is the CBE tag, which contains the identity of the owning work distribution crossbar interface 330.

The attribute data associated with enough primitives should be stored in circular buffers 358 to fill the graphics processing pipeline to the point where the primitive attributes are ultimately read by the PEs 312 during fragment shading. When large numbers of primitives fall onto one GPC 208, attribute data for enough primitives should be stored to smooth load imbalances. In some cases, such as when small primitives are processed, a larger amount of attribute data may need to be buffered. In others, such as when large primitives are processed, a smaller amount of attribute data may need to be buffered, leaving more room in the general-purpose multi-use cache for buffering other data. A mechanism may be provided to allow the device driver 103 to tune the fraction of general-purpose multi-use cache 350 that is consumed by the circular buffers. For example, the device driver 103 may set a threshold value for the amount of work in progress in the currently allocated CBEs 358. When the threshold is exceeded, the CB manager 318 defers allocations of new CBEs 358 until some of the active CBEs 358 have been released. The measure of work in progress may be determined as an estimate of the pixels covered by all the current primitives in flight. In some embodiments, the estimate is generated in PE 312 by summing the bounding box areas divided by two of the primitives processed by the PE 312. Throttling prevents the vertex shaders from running ahead of the pixel shaders and causing the circular buffers to fill up completely.

Figure 6B:
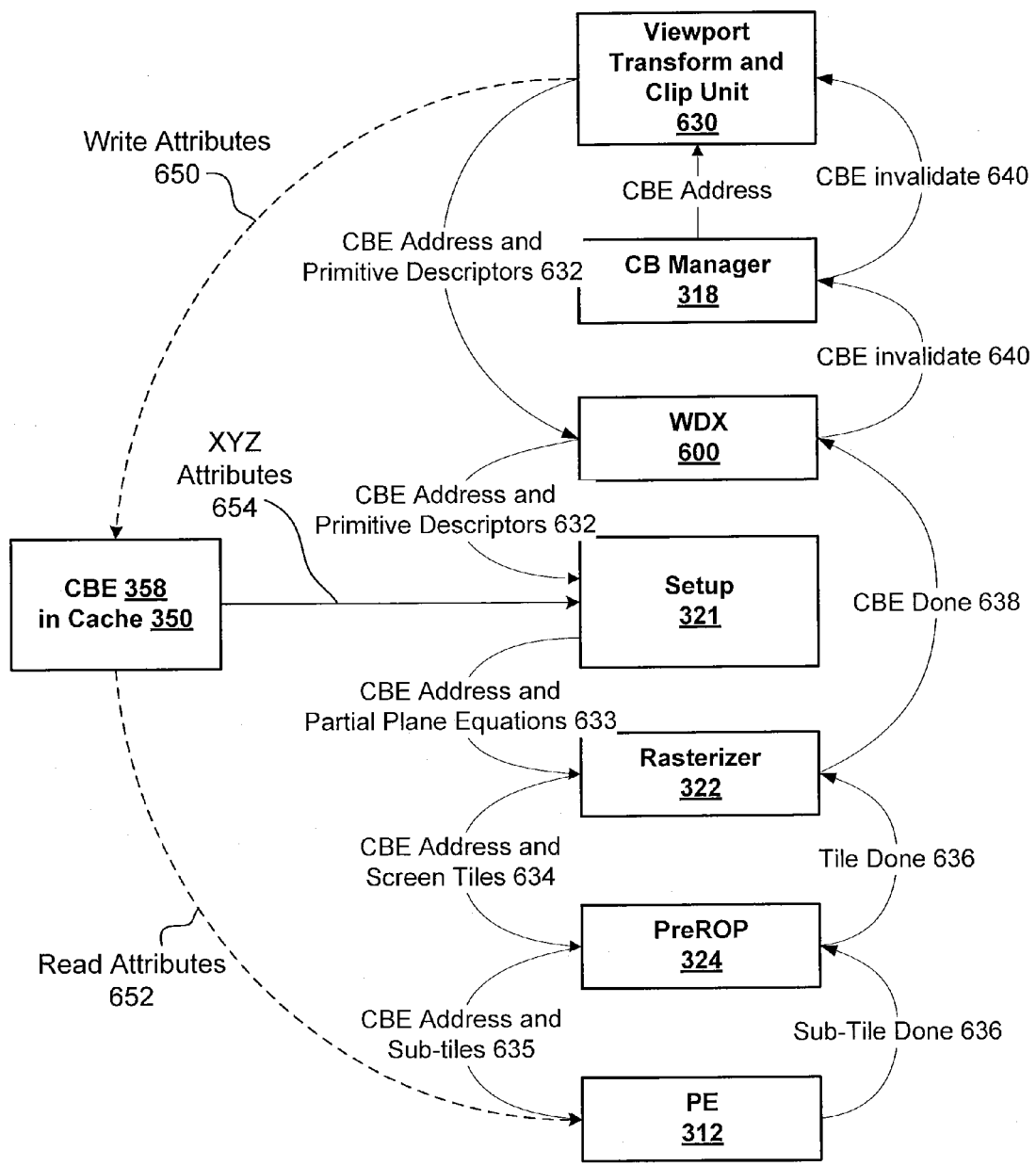
FIG. 6B is a conceptual diagram illustrating the interactions between different units to allocate and release circular buffer entries, according to one embodiment of the present invention.

FIG. 6B is a conceptual diagram illustrating the interactions between different units to allocate and release CBEs 358, according to one embodiment of the present invention. When the viewport transform and clip unit 630 receives a batch of primitives for processing, the viewport transform and clip unit 630 requests the allocation of a CBE 358 for storing the primitive attribute data. The CB manager 318 provides a CBE address that corresponds to an allocated CBE 358 to the viewport transform and clip unit 630. The viewport transform and clip unit 630 then writes attributes 650 to a CBE 358 in the general-purpose multi-use cache 350 and sends the CBE address and primitive descriptors 632 to the WDX 600.

The memory that is allocated to a circular buffer is from a circular buffer heap in PP memory 204. The circular buffer heap is set up via a method and given a virtual address much like a surface. The circular buffer heap is carved up and divided among the circular buffers and this allocation is not changed during the life of the circular buffer. The virtual address never changes, although the physical address may change during context switches (unless the circular buffer is emptied before the context switch). Thus, clients (such as PE 312 and setup 321) may safely save and later use virtual CBE addresses, but not physical CBE addresses. In some embodiments, the system uses physical addresses instead of virtual addresses.

The WDX 600 forwards the CBE address and primitive descriptors 632 to one or more setups 321 based on the screen tiles that intersect the primitives associated with the primitive descriptors 632. The work distribution crossbar interface 330 within the WDX 600 tracks the number of copies of the CBE address and primitive descriptors 632 that are forwarded to setups 321 by maintaining a reference count for each CBE address. The reference count is incremented for each setup 321 that receives the CBE address.

A setup 321 that receives the CBE address and primitive descriptors 632 then accesses the CBE 358 to read XYZ attributes 654 of the primitive attribute data. The setup 321 then generates partial plane equations 633 that are used by the rasterizer to generate coarse screen tiles 633 for primitives. The setup 321 forwards the CBE address and partial plane equations 633 to the rasterizer 322. The rasterizer 322 tracks a tile count of the number of screen tiles that reference a given CBE address. The tile count for each CBE address is incremented for each screen tile that references the CBE address. The rasterizer 322 also generates fine screen tiles from the coarse screen tiles and forwards the CBE address and (fine) screen tiles 635 to the PreROP 324.

The preROP 324 receives the tile done 626 and decrements the sub-tile count corresponding to the CBE tag and sends the tile done 636 to the rasterizer 322 when the sub-tile count equals zero. The rasterizer 322 receives the tile done 626 and decrements the tile count corresponding to the CBE address identified by the CBE tag. If the tile count for the CBE address equals zero, a CBE done message, CBE done 638, is sent to the WDX 600. The WDX 600 receives the CBE done message and decrements the reference count for the CBE address. If the reference count for the CBE address equals zero, a CBE invalidate message that includes the CBE tag, CBE invalidate 640, is sent to the CB manager 318.

In performance cases, circular buffer data stays general-purpose multi-use cache 350 resident. In some embodiments, only during context switches or unusual, non-performance-critical cases will the data be flushed out to frame buffer memory within the PP memory 204. This is achieved by setting the cache priority very high (evict last) for active data. The CB managers 318 perform this task on behalf of the clients when data is written. Importantly, the CB managers 318 also mark the cache lines invalid when CBEs 358 are released to allow those cache lines in the general-purpose multi-use cache 350 to be used for other purposes (e.g. texture).

Figure 7A:
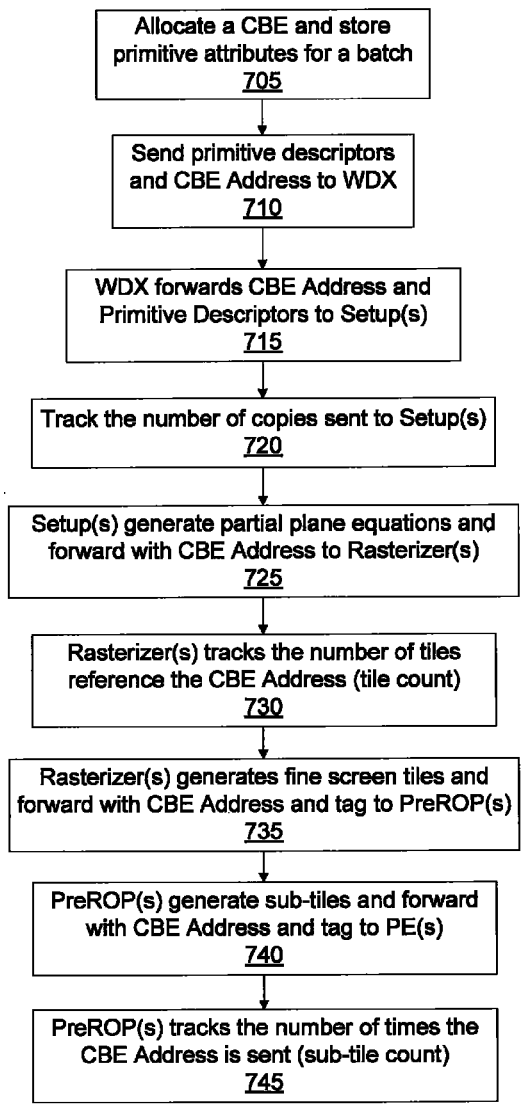
FIG. 7A is a flow diagram of method steps for allocating a circular buffer entry, according to one embodiment of the present invention.

FIG. 7A is a flow diagram of method steps for allocating a CBE 358, according to one embodiment of the present invention. At step 705 a CBE 358 with corresponding CBE address is allocated and the primitive attribute data for a batch is stored in the CBE 358. At step 710 the CB manager 318 sends the CBE address and primitive descriptors 632 to the WDX 600. At step 715 the WDX 600 forwards the CBE address and primitive descriptors to one or more setups 321 The setups 321 that receive the CBE address and primitive descriptors are configured to the screen tiles that intersect the primitives associated with the primitive descriptors. At step 720 the work distribution crossbar interface 330 within the WDX 600 tracks the number of copies of the CBE address and primitive descriptors that are forwarded to setups 321 by maintaining a reference count for each CBE address. The reference count is incremented for each setup 321 that receives the CBE address.

At step 725 the setups 321 that receive the CBE address and primitive descriptors access the CBE 358 to read XYZ attributes of the primitive attribute data. The setups 321 then generate partial plane equations for primitives and forward the CBE address and partial plane equations to the associated rasterizers 322. At step 730 the rasterizers 322 generate (coarse and fine) screen tiles and track a tile count of the number of screen tiles that reference a given CBE address. The tile count for each CBE address is incremented for each screen tile that references the CBE address. At step 735 the rasterizers 322 generate fine screen tiles from the coarse screen tiles and forward the CBE address and (fine) screen tiles to the PreROP 324.

At step 740 the associated PreROPs 324 generates sub-tiles from the fine screen tiles and forwards the CBE address and CBE tag and sub-tiles 635 to the associated PEs 312. At step 745 the preROPs 324 track a sub-tile count for each CBE address that is sent to the PEs 312. The sub-tile count for a particular screen tile is incremented each time the CBE address associated with the screen tile is sent to a PE 312.

Figure 7B:
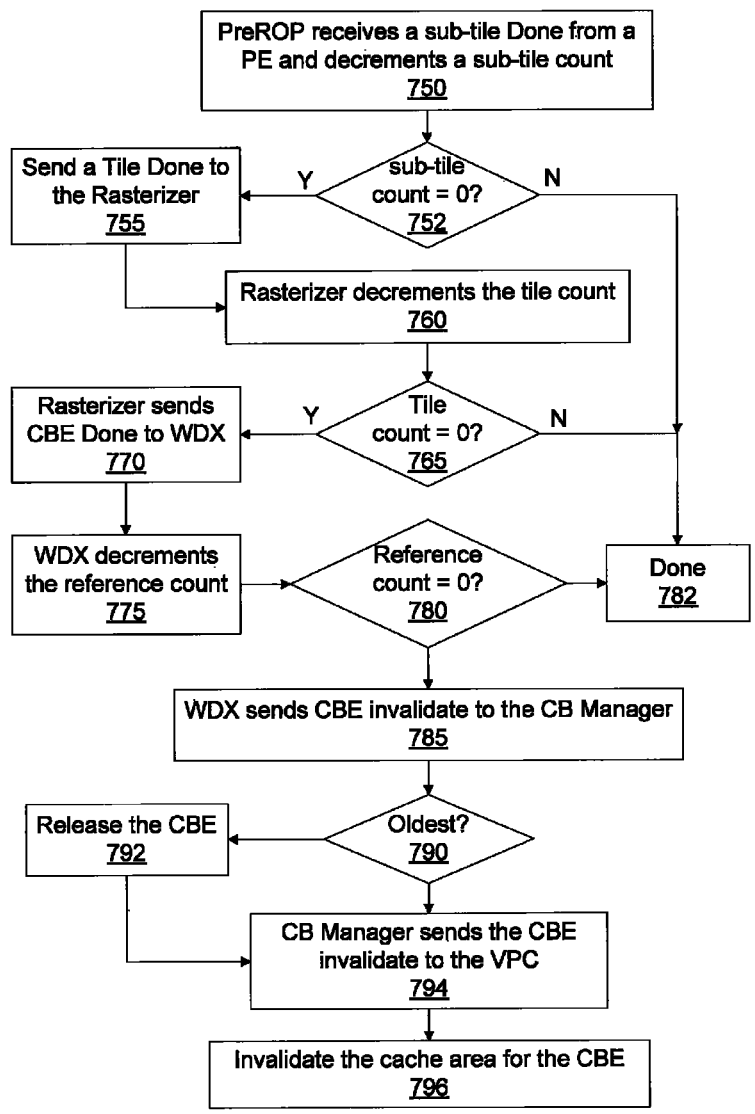
FIG. 7B is a flow diagram of method steps for releasing a circular buffer entry, according to one embodiment of the present invention.

FIG. 7B is a flow diagram of method steps for releasing a CBE 358, according to one embodiment of the present invention. When a PE 312 is done reading the attributes stored in the CBE 358, at step 750 the preROP 324 receives a sub-tile done message, sub-tile done from the PE 312 and decrements the sub-tile count for the CBE address. At step 752, the preROP 324 determines if the sub-tile count for the tile including the sub-tile equals zero, and, if so, at step 755 the preROP 324 sends the tile done to the rasterizer 322. Otherwise, at step 782 the preROP 324 is done and does not send a message to the rasterizer 322. At step 760 the rasterizer 322 receives the tile done and decrements the tile count corresponding to the CBE address. At step 765, the rasterizer 322 determines if the tile count for the CBE address equals zero, and, if so, a CBE done message is sent to the WDX 600. Otherwise, at step 782 the rasterizer is done and does not send a message to the WDX 600. At step 775 the WDX 600 receives the CBE done message and decrements the reference count for the CBE address. At step 780 the work distribution crossbar interface 330 determines if the reference count for the CBE address equals zero, and, if so, at step 785 a CBE invalidate message is sent to the CB manager 318. Otherwise, at step 782 the WDX 600 does not send a message to the CB manager 318.

At step 790 the CB manager 318 determines if the CBE 358 is the oldest CBE 358 that was allocated in response to a request issued by the CB manager 318, and, if not, the CB manager 318 proceeds directly to step 794. Otherwise, at step 792 the CB manager 318 releases the CBE 358 before proceeding to step 794. At step 794 the CB manager 318 sends a CBE invalidate message to the viewport transform and clip unit 630. At step 796 the viewport transform and clip unit 630 receives the CBE invalidate message and invalidates the entries in the general-purpose multi-use cache 350 that are allocated to the CBE 358 associated with the CBE address.

Circular buffers are used to replace several dedicated FIFOs. Essentially, a circular buffer is a FIFO, of which the memory area resides in general-purpose multi-use cache 350 and the control is distributed rather than centralized. In contrast with using dedicated storage for circular buffers, space in the general-purpose multi-use cache 350 is only allocated for storing a circular buffer when the circular buffer is needed, so the space is available to store other data. Circular buffers may be used to transmit state information and primitive attributes between object-space and screen space pipeline stages. A single design is used for circular buffer management, specifically the CB manager 318, so that as many CB managers 318 as are needed may be instantiated.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for sharing a general-purpose multi-use cache for storage of graphics data, comprising:
   allocating a first circular buffer entry of a circular buffer within a portion of the general-purpose multi-use cache to store primitive attribute data, wherein another portion of the general-purpose multi-use cache is configured to store other graphics data;
   writing the primitive attribute data to the first circular buffer entry;
   transmitting a circular buffer entry address corresponding to the first circular buffer entry from a first processing entity configured to perform object space operations to a set of processing entities included within a graphics processing unit that are configured to perform screen-space operations;
   receiving a second circular buffer entry from a second processing entity that is included in the set of processing entities;
   reading modified primitive attribute data from the second circular buffer entry, wherein the modified primitive attribute data has been written by the second processing entity;
   for each processing entity included in the set of processing entities, transmitting a circular buffer done message associated with the first circular buffer entry to the first processing entity when the processing entity the first circular buffer entry;
   generating a circular buffer invalidate message when the circular buffer done message is received from each processing entity included in the set of processing entities; and
   invalidating the first circular buffer entry in the general-purpose multi-use cache using the circular buffer invalidate message.

2. The method of claim 1, further comprising the steps of:
   tracking the number of processing entities in the set of processing entities to which the circular buffer entry address is transmitted by incrementing a reference count for each one of the set of processing entities that receives the circular buffer entry address; and
   decrementing the reference count for each circular buffer done message that is transmitted by one of the set of processing entities to the first processing entity.

3. The method of claim 2, wherein the step of generating the circular buffer invalidate message comprises determining that the reference count equals zero.

4. The method of claim 2, further comprising the steps of:
   tracking a number of the screen tiles that reference the circular buffer entry address by incrementing a tile count for each one of the screen tiles that intersects a primitive associated with the primitive attribute data; and
   decrementing the tile count when the first circular buffer entry is read to process one of the screen tiles that intersects the primitive.

5. The method of claim 4, wherein the step of transmitting the circular buffer done message comprises determining that the tile count equals zero.

6. The method of claim 1, further comprising the step of releasing the first circular buffer entry only when the first circular buffer entry is an oldest allocated circular buffer entry of multiple allocated circular buffer entries.

7. The method of claim 1, wherein the first circular buffer entry is read by a setup unit and an interpolation unit that are each configured to perform screen-space operations.

8. The method of claim 1, further comprising the step of selecting the processing entities in the set of processing entities based on an intersection of each graphics primitive associated with the primitive attribute data and screen tiles.

9. The method of claim 1, wherein an amount of address space that is allocated to store primitive attribute data, including the primitive attribute data stored in the circular buffer entries, is fixed and the portion of the general-purpose multi-use cache that stores circular buffer entries is variable.

10. The method of claim 1, further comprising the step of deferring allocation of a new circular buffer entry when a threshold value of allocated circular buffer entries is exceeded.

11. The method of claim 1, further comprising the step of allocating an additional circular buffer entry to store a processing task.

12. The method of claim 1, wherein the primitive attribute data is governed by a first eviction policy, and at least a portion of the other graphics data stored in the general-purpose multi-use cache is governed by a second eviction policy.

13. The method of claim 1, wherein the first processing entity and each processing entity included in the set of processing entities reside in a graphics processing unit.

14. The method of claim 1, wherein the first processing entity comprises a CPU, and each processing entity included in the set of processing entities resides in a graphics processing unit.

15. A non-transitory computer-readable storage medium storing instructions that, when executed by a processor including a general-purpose multi-use cache, cause sharing of the general-purpose multi-use cache to store graphics data, by performing the steps of:
   allocating a first circular buffer entry of a circular buffer within a portion of the general-purpose multi-use cache to store primitive attribute data, wherein another portion of the general-purpose multi-use cache is configured to store other graphics data;
   writing the primitive attribute data to the first circular buffer entry;
   transmitting a circular buffer entry address corresponding to the first circular buffer entry from a first processing entity configured to perform object space operations to a set of processing entities included within a graphics processing unit that are configured to perform screen-space operations;
   receiving a second circular buffer entry from a second processing entity that is included in the set of processing entities;
   reading modified primitive attribute data from the second circular buffer entry, wherein the modified primitive attribute data has been written by the second processing entity;
   for each processing entity included in the set of processing entities, transmitting a circular buffer done message associated with the first circular buffer entry to the first processing entity when the processing entity is done processing the first circular buffer entry;
   generating a circular buffer invalidate message when the circular buffer done message is received from each processing entity included in the set of processing entities; and
   invalidating the first circular buffer entry in the general-purpose multi-use cache using the circular buffer invalidate message.

16. A system for sharing a general-purpose multi-use cache for storage of graphics data, the system comprising:
   the general-purpose multi-use cache, wherein a first portion of the general-purpose multi-use cache is configured to store primitive attribute data in entries of a circular buffer, a second portion of the general-purpose multi-use cache is configured to store other graphics data, and the general-purpose multi-use cache is configured to invalidate a first circular buffer entry when a circular buffer invalidate message is received;

second processing entities, wherein the second processing entities are configured to:

perform screen-space operations;

allocate a second circular buffer entry;

write modified primitive attribute data to the second circular buffer entry; and transmit a circular buffer done message associated with the first circular buffer entry to the first processing entity when the processing entity is done processing the first circular buffer entry; and the first processing entity, wherein the first processing entity is configured to:

perform object-space operations;

allocate the first circular buffer entry in the circular buffer to store primitive attribute data;

write the primitive attribute data to the first circular buffer entry;

transmit a circular buffer entry address corresponding to the first circular buffer entry from a first processing entity configured to perform object space operations to a set of processing entities included within a graphics processing unit that are configured to perform screen-space operations;

read modified primitive attribute data from the second circular buffer entry;

generate the circular buffer invalidate message when the circular buffer done message is received from each processing entity included in the set of processing entities; and transmit the circular buffer invalidate message to the general-purpose multi-use cache.

17. The system of claim 16, wherein the first processing entity is further configured to:

track the number of processing entities in the set of processing entities to which the circular buffer entry address is transmitted by incrementing a reference count for each one of the set of processing entities that receives the circular buffer entry address; and decrement the reference count for each circular buffer done message that is received by the first processing entity from one of the set of processing entities.

18. The system of claim 17, wherein the first processing entity is further configured to generate the circular buffer invalidate message when the reference count equals zero.

19. The system of claim 17, wherein each one of the set of processing entities is further configured to:

track a number of the screen tiles that reference the circular buffer entry address by incrementing a tile count for each one of the screen tiles that intersects a primitive associated with the primitive attribute data; and decrement the tile count when the first circular buffer entry is read to process one of the screen tiles that intersects the primitive.

20. The system of claim 19, wherein each one of the set of processing entities is configured to transmit the circular buffer done message when the tile count equals zero.

21. The system of claim 16, wherein the first processing entity is further configured to release the first circular buffer entry only when the first circular buffer entry is an oldest allocated circular buffer entry of multiple allocated circular buffer entries.

22. The system of claim 16, wherein the first circular buffer entry is read by a setup unit and an interpolation unit that are each configured to perform screen-space operations.

23. The system of claim 16, wherein the processing entities in the set of processing entities are selected based on an intersection of each graphics primitive associated with the primitive attribute data and screen tiles.

* * * * *

UNITED STATES PATENT AND TRADEMARK OFFICE
CERTIFICATE OF CORRECTION

| | | |
|---|---|---|
| PATENT NO. | : 8,760,460 B1 | Page 1 of 1 |
| APPLICATION NO. | : 12/773712 | |
| DATED | : June 24, 2014 | |
| INVENTOR(S) | : Kilgariff et al. | |

It is certified that error appears in the above-identified patent and that said Letters Patent is hereby corrected as shown below:

In the Claims:

Column 27, Claim 1, Line 27, please insert --is done processing-- before the first.

Signed and Sealed this
Thirtieth Day of September, 2014

Michelle K. Lee
*Deputy Director of the United States Patent and Trademark Office*